(12) United States Patent
Han et al.

(10) Patent No.: US 10,449,637 B2
(45) Date of Patent: Oct. 22, 2019

(54) FLUX-CORED WIRE

(71) Applicant: Kobe Steel, Ltd., Kobe-shi (JP)

(72) Inventors: Peng Han, Fujisawa (JP); Hiroyuki Kawasaki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 783 days.

(21) Appl. No.: 14/912,436

(22) PCT Filed: Aug. 8, 2014

(86) PCT No.: PCT/JP2014/071015
§ 371 (c)(1),
(2) Date: Feb. 17, 2016

(87) PCT Pub. No.: WO2015/029751
PCT Pub. Date: Mar. 5, 2015

(65) Prior Publication Data
US 2016/0193699 A1     Jul. 7, 2016

(30) Foreign Application Priority Data

Aug. 30, 2013    (JP) .................................. 2013-178982

(51) Int. Cl.
*B23K 35/30*     (2006.01)
*B23K 35/36*     (2006.01)
(Continued)

(52) U.S. Cl.
CPC ...... *B23K 35/0266* (2013.01); *B23K 35/0255* (2013.01); *B23K 35/0261* (2013.01);
(Continued)

(58) Field of Classification Search
CPC ............ B23K 35/0266; B23K 35/3053; B23K 35/368
(Continued)

(56) References Cited

U.S. PATENT DOCUMENTS

| 4,571,480 A * | 2/1986 | Sakai ................... B23K 35/368 |
| | | 219/145.22 |
| 2009/0242536 A1 | 10/2009 | Nagashima et al. |
| 2011/0139761 A1* | 6/2011 | Sugahara ........... B23K 35/0266 |
| | | 219/145.22 |

FOREIGN PATENT DOCUMENTS

| EP | 1 707 303 A1 | 10/2006 |
| JP | 63 183795 | 7/1988 |

(Continued)

OTHER PUBLICATIONS

International Preliminary Report on Patentability and Written Opinion dated Mar. 10, 2016 in PCT/JP2014/071015 (with English translation).

(Continued)

*Primary Examiner* — Ibrahime A Abraham
*Assistant Examiner* — John J Norton
(74) *Attorney, Agent, or Firm* — Oblon, McClelland, Maier & Neustadt, L.L.P.

(57) ABSTRACT

Provided is a flux-cored wire with excellent welding workability, AW performance, and SR performance that can use both 100% $CO_2$ gas and Ar—$CO_2$ mixed gas as the shield gas in an initial layer welding for a structure body, particularly, a pipeline. The flux-cored wire with a flux filled into a steel outer sheath, includes, relative to the total mass of the wire: Mn: 1.5 to 3.1% by mass; Ni: 0.2% or more by mass and less than 1.00% by mass; at least one kind of Si, a Si alloy, and a Si oxide: 0.3 to 1.0% by mass in terms of Si; Ti: 0.05 to 0.29% by mass; C: 0.06 to 0.30% by mass; at least one kind of B, a B alloy, and a B oxide: 0.0030 to 0.0090% by mass in terms of B; and Fe: 91 to 97% by mass.

6 Claims, 1 Drawing Sheet

(51) Int. Cl.
  *B23K 35/38* (2006.01)
  *B23K 35/02* (2006.01)
  *C22C 33/02* (2006.01)
(52) U.S. Cl.
  CPC ........ *B23K 35/306* (2013.01); *B23K 35/3053* (2013.01); *B23K 35/3066* (2013.01); *B23K 35/3073* (2013.01); *B23K 35/36* (2013.01); *B23K 35/38* (2013.01); *C22C 33/02* (2013.01)
(58) Field of Classification Search
  USPC .................................................... 219/145.22
  See application file for complete search history.

(56) References Cited

FOREIGN PATENT DOCUMENTS

| | | |
|---|---|---|
| JP | 2001 254141 | 9/2001 |
| JP | 2006 281223 | 10/2006 |
| JP | 2008 126262 | 6/2008 |
| JP | 2008126262 A * | 6/2008 |
| JP | 4776508 B2 | 9/2011 |
| JP | 2012 115878 | 6/2012 |
| JP | 5207994 | 6/2013 |
| WO | WO 2011/037272 A1 | 3/2011 |

OTHER PUBLICATIONS

International Search Report dated Oct. 7, 2014, in PCT/JP2014/071015 filed Aug. 8, 2014.

* cited by examiner

FLUX-CORED WIRE

TECHNICAL FIELD

The present invention relates to flux-cored wires for use in welding steel with a tensile strength of 490 to 570 MPa level, and more specifically to a flux-cored wire for gas-shielded arc welding that is used to weld an initial layer of a structure body, such as a pipeline, that is exposed to the environment containing a large amount of hydrogen sulfide (sour environment).

BACKGROUND ART

Flux-cored wires for use in welding initial layers of pipelines have been conventionally required to have excellent welding workability and further excellent mechanical properties (tensile strength and absorbed energy at a low temperature) of weld metal in the as-welded (AW) condition: so-called AW performance.

Patent Document 1 proposes a flux-cored wire for gas-shielded arc welding with excellent welding workability that can produce good penetration beads in welding an initial layer of a pipeline. The wire composition is characterized by filling 8 to 20% by mass of a flux into a steel outer sheath made of C: 0.08% or less by mass, the flux containing: alkali metal: 0.1 to 5% by mass, a ratio of (Na/K): 1 to 50%, C: 0.3 to 2.5% by mass, metal powder: 80% or more by mass, and a slag former.

Patent Document 2 proposes a flux-cored wire for Ar—$CO_2$ mixed gas-shielded arc welding with excellent AW performance. The wire structure is characterized by including a flux filled into a steel outer sheath, the flux containing 97% or more by mass of metal powder, the metal powder containing 4.0 to 15.5% by mass of iron powder, relative to the total mass of the wire, the iron powder containing 0.25% or less by mass of oxygen, furthermore, the wire components of the wire structure containing, in percent by mass relative to the total mass of the wire: C: 0.03 to 0.12%, Si: 0.5 to 1.2%, Mn: 1.5 to 3.5%, S: 0.005 to 0.05%, and one, or two or more kinds of an alkali metal oxide, an alkali metal fluoride, and a metal oxide in total: 0.35% or less, with the balance being Fe and inevitable impurities.

RELATED ART DOCUMENT

Patent Documents

Patent Document 1: JP 63-183795 A
Patent Document 2: JP 5207994 B1

DISCLOSURE OF THE INVENTION

Problems to be Solved by the Invention

However, the wire disclosed in Patent Document 1 is designed to have the flux composition for penetration-welding specifications. As a result, the wire mentioned in Patent Document 1 has a problem that in ensuring the workability of the penetration welding, the AW performance would be sacrificed, and the usable temperature of the wire is about −30° C. and above, which cannot be applied to specifications requiring a further lower temperature side. The wire of Patent Document 1 has another problem of degradation in mechanical properties (tensile strength and absorbed energy at a low temperature) of a weld metal after stress relief annealing (SR), that is, degradation in the so-called SR performance.

The wire disclosed in Patent Document 2 ensures the AW performance of the weld metal in the as-welded condition by designing the composition of the flux, but has a problem of degradation in welding workability (shape of a penetration bead) and SR performance in welding the initial layer of the pipeline.

The wires mentioned in Patent Documents 1 and 2 have problems that during welding of the initial layer for the pipeline, only a mixed gas of Ar—$CO_2$ is used as a shield gas, whereby 100% $CO_2$ gas cannot be used as a shield gas.

The present invention has been made in view of the foregoing problems, and it is an object of the present invention to provide a flux-cored wire with excellent welding workability, AW performance and SR performance that can use both 100% $CO_2$ gas and Ar—$CO_2$ mixed gas as the shield gas in an initial layer welding for a structure body, particularly, a pipeline. Note that in the present invention, as mentioned above, the term AW performance as used herein means the mechanical properties (tensile strength and absorbed energy at a low temperature) of a weld metal in the as-welded condition, while the term SR performance as used herein means the mechanical properties (tensile strength and absorbed energy at a low temperature) of a weld metal after the SR.

Means for Solving the Problems

A flux-cored wire according to the present invention is characterized by being filled a flux into a steel outer sheath, the flux-cored wire including, relative to the total mass of the wire: Mn: 1.5 to 3.1% by mass; Ni: 0.2% or more by mass and less than 1.00% by mass; at least one kind of Si, a Si alloy, and a Si oxide: 0.3 to 1.0% by mass in terms of Si; Ti: 0.05 to 0.29% by mass; C: 0.06 to 0.30% by mass; at least one kind of B, a B alloy, and a B oxide: 0.0030 to 0.0090% by mass in terms of B; and Fe: 91 to 97% by mass.

In the flux-cored wire of the present invention, a Si content when using Si as a Si source is preferably in a range of 0.3 to 0.9% by mass relative to the total mass of the wire. In the flux-cored wire of the present invention, a Si oxide content when using a Si oxide as the Si source is preferably in a range of 0.11 to 0.40% by mass relative to the total mass of the wire.

In the flux-cored wire of the present invention, the C content is preferably in a range of 0.10 to 0.30% by mass. In the flux-cored wire of the present invention, the C content is preferably more than 0.12% by mass and 0.30% or less by mass.

With such a configuration, the flux-cored wire contains Mn, Ni, (at least one kind of Si, a Si alloy and a Si oxide), Ti, C, (at least one kind of B, a B alloy and a B oxide), and Fe in respective predetermined amounts. Thus, in welding an initial layer of the structure body, particularly, the pipeline, both 100% $CO_2$ gas and an Ar—$CO_2$ mixed gas can be used as the shield gas, thereby producing good penetration beads (back beads) to improve the welding workability as well as the AW and SR performances.

The flux-cored wire of the present invention preferably further includes, relative to the total mass of the wire: S: 0.005 to 0.040% by mass, the flux-cored wire being restricted to include: Al: 0.10% or less by mass, a Na compound and a K compound in total: 0.20% or less by mass in total in terms of Na and in terms of K, and a F compound: 0.20% or less by mass in terms of F.

With such a configuration, the flux-cored wire further contains S, Al, a Na compound and a K compound in total, and an F compound in respective predetermined amounts, thereby further improving the welding workability, AW performance and SR performance.

Further, in the flux-cored wire of the present invention, ([C]+[Si])/([Ti]+[Ni]) is preferably in a range of 0.30 to 1.2, wherein [C] is a C content, [Si] is a content in terms of Si, [Ti] is a Ti content, and [Ni] is a Ni content.

With such a configuration, the flux-cored wire has a predetermined value of ([C]+[Si])/([Ti]+[Ni]). Thus, a transition temperature of brittle fracture can be transferred to the lower temperature side, while good penetration beads (back beads) are obtained, thereby further improving the welding workability, AW performance and SR performance of the wire.

Effects of the Invention

In the flux-cored wire according to the present invention, both 100% $CO_2$ gas and an Ar—$CO_2$ mixed gas can be used as the shield gas in the initial layer welding for the structure body, particularly, a pipeline, so that the flux-cored wire has the excellent welding workability, AW performance and SR performance. As a result, the safety and welding efficiency of the structure body, such as a pipeline, exposed to a low-temperature environment, particularly, a sour environment, can be further enhanced.

BEST MODE FOR CARRYING OUT THE INVENTION

Embodiments of the present invention will be described in detail below.

<<Flux-Cored Wire>>

The flux-cored wire of the present invention is formed by filling a flux into a steel outer sheath. The flux-cored wire contains Mn, Ni, (at least one kind of Si, a Si alloy and a Si oxide), Ti, C, (at least one kind of B, a B alloy and a B oxide), and Fe in respective predetermined amounts, relative to the total mass of the wire. Note that the balance except for the above-mentioned components includes inevitable impurities.

The term "oxide" as used herein means one or more kinds of a "single oxide" and a "composite oxide". The "single oxide" indicates, for example, regarding Si, an oxide of a single Si element ($SiO_2$). The "composite oxide" indicates both an aggregation of a plurality of kinds of single oxides of Si and an element other than Si; and an oxide containing Si and a plurality of metal components other than Si.

The reasons for restricting the contents of wire components will be described below. Note that each of the wire components is added to one or both of the steel outer sheath and the flux.

<Mn: 1.5 to 3.1% by Mass>

A manganese (Mn) content in the flux-cored wire is set at 1.5 to 3.1% by mass relative to the total mass of the wire. When the Mn content is less than 1.5% by mass, the AW performance and the SR performance of the wire are degraded because of the insufficient strength of the wire. When the Mn content exceeds 3.1% by mass, the AW performance of the wire is degraded because of the excessive strength and hardenability of the wire. Note that when the Mn content is large, the SR performance is reduced in some cases. The upper limit of Mn content is preferably 2.5% or less by mass from the viewpoint of improving the AW performance and SR performance.

Note that Mn sources can include addition of metal Mn, a Fe—Mn alloy or a Si—Mn alloy into the flux, addition of metal Mn into the steel outer sheath, and the like.

<Ni: 0.2% or More by Mass and Less than 1.00% by Mass>

A nickel (Ni) content in the flux-cored wire is set at 0.2% or more by mass and less than 1.00% by mass relative to the total mass of the wire. Conventionally, to completely secure the AW performance of the weld metal, Ni is added to the wire in a content of 1.00% or more by mass. However, the wire containing a large amount of Ni generates specific sulfides under the sour environment and thus has degraded the resistance to sulfide stress corrosion cracking. In order to conform to National Association of Corrosion Engineers (NACE) standards, the Ni content in the present invention is set at 0.2% or more by mass and less than 1.00% by mass, which is lower than a conventional range. When the Ni content is less than 0.2% by mass, the effect of improving the AW performance exhibited by the wire becomes small. When the Ni content is 1.00% or more by mass, the NACE standards cannot be satisfied, the hot cracking occurs, and the SR performance and the welding workability are degraded. The lower limit of Ni content is preferably 0.20% or more by mass, and preferably 0.40% or more by mass in view of improving the AW performance.

Note that Ni sources can include addition of metal Ni or a Ni—Mg alloy into the flux, addition of Ni into the steel outer sheath, and the like.

<At Least One Kind of Si, Si Alloy and Si Oxide: 0.3 to 1.0% by Mass in Terms of Si>

The content of at least one kind of silicon (Si) (metal Si), a Si alloy and a Si oxide in the flux-cored wire is set at 0.3 to 1.0% by mass in the terms of Si, relative to the total mass of the wire. The expression "content in terms of Si" as used herein means a value obtained by representing the content of at least one kind of "metal Si", "Si alloy", and "Si oxide" in terms of "metal Si" content. When the content in terms of Si is less than 0.3% by mass, blow holes are more likely to occur due to insufficient deoxidation, leading to degradation in the AW performance and SR performance. Further, the workability of penetration welding (specifically, the shape of a back bead) is degraded. When the content in terms of Si exceeds 1.0% by mass, a matrix ferrite is embrittled, leading to degradation in AW performance and SR performance.

The lower limit of the content in terms of Si is preferably 0.5% or more by mass in view of improving the AW performance, SR performance and welding workability. The upper limit of the content in terms of Si is preferably 0.8% or less by mass in view of improving the AW performance and SR performance.

Note that Si sources can include addition of a Fe—Si alloy, a Si—Mn alloy or $SiO_2$ into the flux, addition of metal Si into the steel outer sheath, and the like.

In the flux-cored wire, when using metal Si as a Si source, a Si content s preferably in a range of 0.3 to 0.9% by mass relative to the total mass of the wire. When using a Si oxide (for example, $SiO_2$) as the Si source in the flux-cored wire, the Si oxide content (for example, $SiO_2$) is preferably in a range of 0.11 to 0.40% by mass, and more preferably in a range of 0.15 to 0.40% by mass. Note that Si-oxide sources (for example, a $SiO_2$ source) can include silica, potash glass, soda glass, and the like.

<Ti: 0.05 to 0.29% by Mass>

A titanium (Ti) content in the flux-cored wire is set at 0.05 to 0.29% by mass relative to the total mass of the wire. When the Ti content is less than 0.05% by mass, the sufficient nucleation cannot be generated, and the AW performance and SR performance are degraded because of a coarsen ferrite. When the Ti content exceeds 0.29% by mass, the amount of solid-soluted Ti might become excessive, leading to degradation in the AW performance due to the excessive strength.

The lower limit of Ti content is preferably 0.10% or more by mass in view of improving the AW performance and SR performance. The upper limit of Ti content is preferably 0.25% or less by mass in view of improving the AW performance.

Note that Ti sources can include addition of a Fe—Ti alloy into the flux, addition of metal Ti into the steel outer sheath, and the like.

<C: 0.06 to 0.30% by Mass>

A carbon (C) content in the flux-cored wire is set at 0.06 to 0.30% by mass relative to the total mass of the wire. When the C content is less than 0.06% by mass, the effect of stabilizing the AW performance and SR performance is small due to insufficient strength. Further, the workability of penetration welding (specifically, the shape of a back bead) is degraded. When the C content exceeds 0.30% by mass, hot cracking may occur, degrading the welding workability, and due to the excessive strength, the AW performance and SR performance may be degraded.

The lower limit of the C content is preferably 0.10% or more by mass in view of improving the AW performance, SR performance and welding workability. The C content preferably exceeds 0.12% by mass and 0.30% or less by mass.

Note that C sources can include addition of graphite into the flux, addition of C from a Fe—Mn alloy, a Fe—Si alloy and the like into the flux, addition of C into the steel outer sheath and the like.

<At Least One Kind of B, B Alloy, and B Oxide: 0.0030 to 0.0090% by Mass in Terms of B>

The content of at least one kind of boron (B) (metal B), a B alloy and a B oxide in the flux-cored wire is set at 0.0030 to 0.0090% by mass in the terms of B, relative to the total mass of the wire. The expression "content in terms of B" as used herein means a value obtained by representing the content of at least one kind of "metal B", "B alloy", and "B oxide" in terms of "metal B" content. When the content in terms of B is less than 0.0030% by mass, the effect of improving the AW performance becomes small. When the content in terms of B exceeds 0.0090% by mass, hot cracking may occur, degrading the welding workability.

The lower limit of the content in terms of B is preferably 0.0040% or more by mass in view of improving the AW performance. The upper limit of the content in terms of B is preferably 0.0080% or less by mass in view of improving the welding workability.

B sources can include addition of $B_2O_3$ or a Fe—Si—B alloy into the steel outer sheath or flux.

<Fe: 91 to 97% by Mass>

An iron (Fe) content in the flux-cored wire is set at 91 to 97% by mass relative to the total mass of the wire. In the flux-cored wire (metal-based flux-cored wire) of the present invention, when the Fe content is less than 91% by mass, the amount of generated slags might become large, easily causing welding defects, including slag inclusion, which lead to degradation in welding workability. When the Fe content exceeds 97% by mass, essential components other than Fe (Mn, Ni, Si, Ti, C, B) cannot be added. Note that Fe sources can include addition of iron powder and a Fe alloy into the flux, in addition to the steel outer sheath.

<Inevitable Impurities>

Niobium (Nb), vanadium (V), molybdenum (Mo), chrome (Cr), and the like may be contained as inevitable impurities in respective predetermined amounts as long as they do not affect the objects of the present invention. The contents of these inevitable impurities are as follows:

Nb: 0.040% or less by mass;
V: 0.040% or less by mass;
Mo: 0.02% or less by mass; and
Cr: less than 0.30% by mass.

Note that Nb, V, Mo, Cr, and the like may be contained in the form of alloy.

Preferably, the flux-cored wire of the present invention includes, in addition to the aforementioned components, S in a predetermined amount and has the amounts of Al, (a Na compound and a K compound), and a F compound restricted to respective predetermined values, relative to the total mass of the wire. Note that each of S, Al, a Na compound, a K compound, and an F compound is added into one or both of the steel outer sheath and flux.

<S: 0.005 to 0.040% by Mass>

A sulfur (S) content in the flux-cored wire is set at 0.005 to 0.040% by mass relative to the total mass of the wire. When the S content is less than 0.005% by mass, the welding workability (particularly, the shape of a back bead) is easily degraded. When the S content exceeds 0.040% by mass, the resistance to hot cracking of the weld metal is degraded. Note that S sources can include addition of iron sulfide or the like into the steel outer sheath or flux.

<Al: 0.10% or Less by Mass>

An aluminum (Al) content in the flux-cored wire is preferably restricted to 0.10% or less by mass relative to the total mass of the wire. When the Al content exceeds 0.10% by mass, spatters will be generated in a large amount, easily degrading the penetration welding workability. The Al content may be 0% by mass. Note that Al sources can include addition of an Al metal, a Fe—Al alloy or an Al—Mg alloy into the steel outer sheath or flux.

<Total of Na Compound and K Compound: 0.20% or Less by Mass in Total in Terms of Na and in Terms of K>

The total content of Na compounds and K compounds in the flux-cored wire is preferably restricted to 0.20% or less by mass in total in terms of Na and in terms of K, respectively, relative to the total mass of the wire. Here, the expression "content in terms of Na" as used herein means a value obtained by representing the content of "Na compound" in terms of "metal Na" content. Further, the term "content in terms of K" as used herein means a value obtained by representing the content of "K compound" in terms of "metal K" content.

The Na compound and the K compound are components to be added to the wire as arc stabilizers. However, when the total content in terms of Na and in terms of K exceeds 0.20% by mass, the amount of generated spatters tends to increase, easily degrading the welding workability. Thus, the total content in terms of Na and in terms of K is preferably equal to or less than 0.20% by mass. The lower limit of the total content in terms of Na and in terms of K is not specifically limited and may be 0% by mass. When adding these compounds, to obtain their effects, the total content of Na and K compounds in terms of Na and in terms of K is preferably equal to or more than 0.01% by mass.

The Na-compound sources can include addition of a Na oxide, such as Na-feldspar, or a Na fluoride, such as NaF, into the steel outer sheath or flux. The K-compound sources can include addition of a K oxide, such as K-feldspar, or a K fluoride, such as $K_2SiF_6$, into the steel outer sheath or flux. Note that a Na ferrite, a K ferrite and the like may be used as sources for these compounds.

<F Compound: 0.20% or Less by Mass in, Terms of F>

A content of fluorine (F) compound in the flux-cored wire is preferably restricted to 0.20% or less by mass in terms of F, relative to the total mass of the wire. Here, the expression "content in terms of F" as used herein means a value obtained by representing the content of "F compound" in terms of "F" content.

The F compound is a component to be added to the wire as arc stabilizer. However, when the content in terms of F exceeds 0.20% by mass, the amount of generated spatters tends to increase, easily degrading the welding workability. Thus, the content in terms of F is preferably 0.20% or less by mass. The lower limit of the content in terms of F is not specifically limited and may be 0% by mass. When adding an F compound, to obtain its effects, the content in terms of F is preferably equal to or more than 0.01% by mass. Note that the F-compound sources can include addition of LiF, $K_2SiF_6$, NaF or the like into the steel outer sheath or flux.

In the flux-cored wire according to the present invention, ([C]+[Si])/([Ti]+[Ni]) is preferably in a predetermined range, wherein [C] is a C content, [Si] is a Si content, [Ti] is a Ti content and [Ni] is a Ni content.

<([C]+[Si])/([Ti]+[Ni]) 0.30 to 1.2>

In the flux-cored wire, to ensure both the AW performance and penetration welding workability, as mentioned above, the component composition of the wire is restricted, so that the flux-cored wire can achieve both these properties to some degree. The inventors have found that both the AW performance and penetration welding workability can be surely ensured by further specifying the ([C]+[Si])/([Ti]+[Ni]) within a range of 0.30 to 1.2 in the flux-cored wire.

Figure 1:
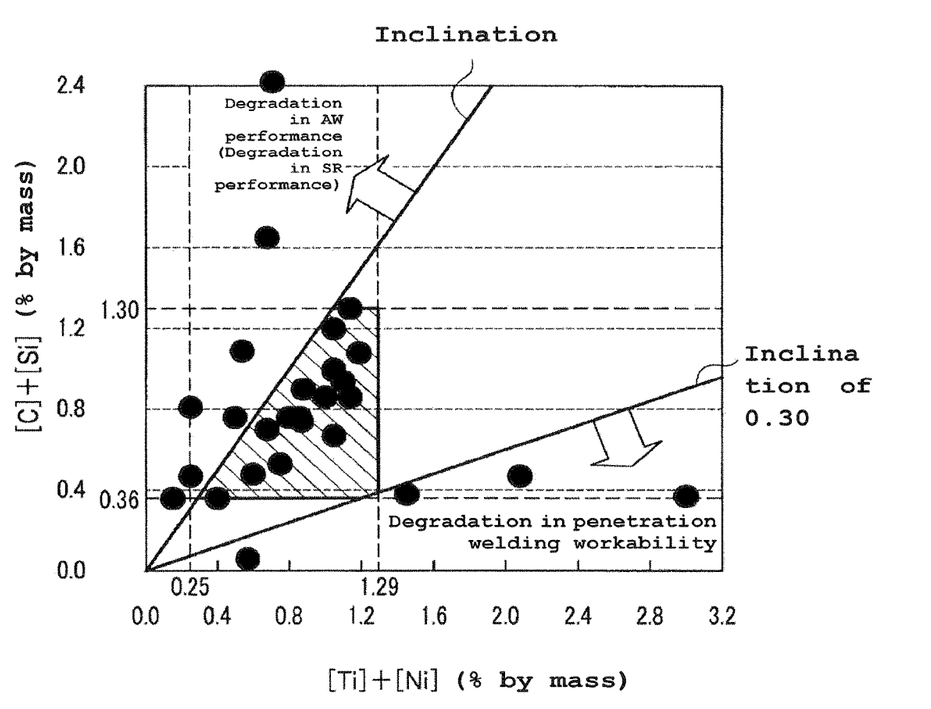
FIG. 1 shows a diagram of the relationship between the ([C]+[Si])/([Ti]+[Ni]), and the penetration welding workability and AW performance in the flux-cored wire.

As shown in FIG. 1, when the ([C]+[Si])/([Ti]+[Ni]) indicated by an inclination of a straight line is less than 0.30, the shape of the back bead is worsened due to the excessively small addition of [C]+[Si], thus easily degrading the penetration welding workability. Owing to the excessive addition of [Ti]+[Ni], the hardenability becomes excessive, whereby the AW performance is easily degraded. On the other hand, when ([C]+[Si])/([Ti]+[Ni]) exceeds 1.2, the excessive addition of [C]+[Si] makes the hardenability excessive, thus easily degrading the AW performance. The addition of excessively small amount of [Ti]+[Ni] easily degrades the AW performance. When ([C]+[Si])/([Ti]+[Ni]) exceeds 1.2, the SR performance is not always reduced, but could be reduced in some cases. Note that the upper limit of ([C]+[Si])/([Ti]+[Ni]) is preferably 1.20 or less in view of improving the AW performance and SR performance.

<Other Points>

In the flux-cored wire of the present invention, an alloy element other than those mentioned above, an arc stabilizer and the like may be added as needed. To the flux, there can be added, as wire components, for example, a small amount of Ca, Li, etc., as a fine adjustment agent for deoxidation or the like, or small amounts of Cu, Co, and N as a further hardening agent for weld metal. An alkali metal compound other than Na and K may be contained in a minute amount. These elements do not affect the objects of the present invention.

The flux-cored wire may have any size as long as its wire diameter is in a range of 1.0 to 2.0 mm. The wire diameter is more preferably in a range of 1.2 to 1.6 mm in terms of actual use. The filling rate of the flux (i.e. the ratio of the mass of the flux to the total mass of the wire) is not specifically limited, but is preferably in a range of 10 to 30% by mass, and more preferably in a range of 13 to 20% by mass in terms of stability during production of the flux-cored wire. The cross-sectional shape of the flux-cored wire is not specifically limited, and the internal shape of the wire may be arbitrary, regardless of seams.

Methods for manufacturing the flux-cored wire include: a method that involves spreading a flux in the longitudinal direction of a steel strip, forming the steel and flux to have a circular cross-section in such a manner as to hold the flux in the steel strip, and extending the formed steel and flux; and a method that involves filling a flux into a steel pipe with a large diameter and extending the steel pipe. However, neither of these methods affects the present invention, so that either method may be used to manufacture the wire. Components of the steel outer sheath are not specifically restricted, but materials of mild steel or low-alloy steel is generally used therefor in terms of cost and wire drawing properties. Cu plating may be applied to the surface of the wire in some cases, but the presence or absence of plating is not considered in the present invention.

EXAMPLES

The effects of the present invention will be described below by comparison between Examples satisfying the requirements of the present invention and Comparative Examples not satisfying the requirements thereof.

A flux was filled into a steel outer sheath having the composition shown in Table 1. In this way, flux-cored wires (with a wire diameter of 1.2 mm) having wire components shown in Tables 2 and 3 were manufactured. Note that the content of each component in the flux-cored wire was measured in accordance with JISG1253 and JISZ2613. The wire components shown in Tables 2 and 3 were represented in units of % by mass, relative to the total mass of the wire, with the balance being inevitable impurities.

TABLE 1

| | Chemical components (% by mass) | | | | | |
|---|---|---|---|---|---|---|
| | C | Si | Mn | P | S | Ni |
| Steel outer sheath | 0.05 | 0.15 | 0.35 | 0.01 | 0.01 | 0.01 |

(Note)
The balance includes Fe and inevitable impurities.

TABLE 2

| | Chemical components (% by mass) | | | | | | | | |
|---|---|---|---|---|---|---|---|---|---|
| Wire No. | Fe | C | Mn | Content in terms of Si | Si | $SiO_2$ | Ti | Ni | Al |
| 1 | 96 | 0.14 | 2.0 | 0.6 | 0.48 | 0.26 | 0.17 | 0.80 | 0.04 |
| 1-A | 96 | 0.14 | 2.0 | 0.6 | 0.48 | 0.26 | 0.17 | 0.80 | 0.04 |
| 2 | 95 | 0.20 | 2.5 | 0.8 | 0.64 | 0.35 | 0.25 | 0.80 | 0.03 |
| 3 | 97 | 0.06 | 2.0 | 0.3 | 0.25 | 0.11 | 0.20 | 0.20 | 0.01 |
| 4 | 96 | 0.07 | 1.9 | 0.6 | 0.50 | 0.22 | 0.25 | 0.80 | 0.02 |
| 5 | 94 | 0.30 | 3.1 | 1.0 | 0.81 | 0.40 | 0.15 | 0.99 | 0.02 |
| 6 | 95 | 0.06 | 2.7 | 0.8 | 0.66 | 0.30 | 0.24 | 0.90 | 0.01 |
| 7 | 95 | 0.06 | 2.7 | 0.7 | 0.56 | 0.29 | 0.20 | 0.66 | 0.03 |
| 8 | 96 | 0.06 | 2.3 | 0.7 | 0.56 | 0.29 | 0.20 | 0.30 | 0.03 |
| 9 | 96 | 0.06 | 2.2 | 0.7 | 0.56 | 0.29 | 0.20 | 0.60 | 0.03 |
| 10 | 95 | 0.06 | 2.9 | 0.8 | 0.56 | 0.29 | 0.20 | 0.80 | 0.03 |
| 11 | 97 | 0.08 | 1.7 | 0.4 | 0.26 | 0.29 | 0.20 | 0.40 | 0.03 |
| 12 | 96 | 0.30 | 1.6 | 0.6 | 0.46 | 0.30 | 0.28 | 0.60 | 0.02 |

TABLE 2-continued

| | | | | | Chemical components (% by mass) | | | | | |
|---|---|---|---|---|---|---|---|---|---|---|
| Wire No. | Fe | C | Mn | Content in terms of Si | Si | SiO$_2$ | Ti | Ni | Al | |
| 13 | 94 | 0.24 | 3.1 | 0.7 | 0.23 | 1.00 | 0.20 | 0.90 | 0 | |
| 14 | 89 | 0.08 | 6.1 | 1.0 | 0.81 | 0.40 | 0.29 | 0.90 | 0.03 | |
| 15 | 96 | 0.03 | 2.0 | 0.5 | 0.44 | 0.12 | 0.10 | 0.65 | 0.06 | |
| 16 | 95 | 0.07 | 1.0 | 0.3 | 0.22 | 0.18 | 0.50 | 2.50 | 0.05 | |
| 17 | 96 | 0.06 | 3.1 | 0 | 0 | 0 | 0.27 | 0.30 | 0.02 | |
| 18 | 95 | 0.08 | 2.5 | 0.3 | 0.19 | 0.23 | 0.75 | 0.70 | 0.01 | |
| 19 | 94 | 0.07 | 3.0 | 0.4 | 0.31 | 0.20 | 0.28 | 1.80 | 0.03 | |
| 20 | 99 | 0.06 | 0.2 | 0.3 | 0.25 | 0.11 | 0.05 | 0.10 | 0.04 | |
| 21 | 96 | 0.32 | 2.1 | 0.4 | 0.22 | 0.34 | 0.28 | 0.40 | 0.01 | |
| 22 | 92 | 0.09 | 5.5 | 0.9 | 0.78 | 0.25 | 0.25 | 0.80 | 0.05 | |
| 23 | 94 | 0.15 | 3.0 | 1.5 | 1.34 | 0.35 | 0.08 | 0.60 | 0.01 | |
| 24 | 94 | 0.22 | 2.3 | 2.2 | 2.08 | 0.25 | 0.01 | 0.70 | 0.03 | |
| 25 | 96 | 0.11 | 1.5 | 0.7 | 0.54 | 0.34 | 0.25 | 0 | 0.26 | |
| 26 | 96 | 0.27 | 2.8 | 0.2 | 0.20 | 0 | 0.05 | 0.20 | 0.02 | |
| 27 | 95 | 0.29 | 2.7 | 0.8 | 0.80 | 0 | 0.04 | 0.50 | 0.05 | |
| 28 | 95 | 0.50 | 2.1 | 0.7 | 0.56 | 0.29 | 0.25 | 0.80 | 0.03 | |

(Note)
"0" means the component of interest is not included.

TABLE 3

| | Chemical components (% by mass) | | | | | | | | |
|---|---|---|---|---|---|---|---|---|---|
| Wire No. | Content in terms of B | B$_2$O$_3$ | Content in terms of F | NaF | S | Content in terms of Na + Content in terms of K | Others (arc stabilizer, etc.) | ([C] + [Si])/ ([Ti] + [Ni]) | Flux filling rate (%) |
| 1 | 0.0060 | 0.019 | 0.01 | 0.02 | 0.020 | 0.05 | 0.05 | 0.76 | 16.0 |
| 1-A | 0.0060 | 0.019 | 0.01 | 0.02 | 0.020 | 0.05 | 0.05 | 0.76 | 16.0 |
| 2 | 0.0070 | 0.022 | 0.03 | 0.07 | 0.006 | 0.10 | 0.10 | 0.95 | 16.0 |
| 3 | 0.0030 | 0.010 | 0.02 | 0.04 | 0.020 | 0.03 | 0.08 | 0.90 | 16.0 |
| 4 | 0.0050 | 0.016 | 0.04 | 0.09 | 0.012 | 0.10 | 0.05 | 0.64 | 16.0 |
| 5 | 0.0090 | 0.029 | 0.03 | 0.07 | 0.030 | 0.04 | 0.06 | 1.14 | 16.0 |
| 6 | 0.0080 | 0.025 | 0.02 | 0.04 | 0.005 | 0.05 | 0.05 | 0.75 | 16.0 |
| 7 | 0.0060 | 0.019 | 0.13 | 0.29 | 0.007 | 0.17 | 0.15 | 0.88 | 16.0 |
| 8 | 0.0060 | 0.019 | 0.07 | 0.15 | 0.009 | 0.14 | 0.10 | 1.52 | 16.0 |
| 9 | 0.0060 | 0.019 | 0 | 0 | 0 | 0.10 | 0.10 | 0.95 | 16.0 |
| 10 | 0.0060 | 0.019 | 0 | 0 | 0.013 | 0.15 | 0.20 | 0.86 | 16.0 |
| 11 | 0.0060 | 0.019 | 0.03 | 0.07 | 0 | 0.10 | 0.10 | 0.80 | 16.0 |
| 12 | 0.0042 | 0.013 | 0.10 | 0.22 | 0.025 | 0.13 | 0.10 | 1.02 | 15.0 |
| 13 | 0.0066 | 0.021 | 0.06 | 0.13 | 0.006 | 0.08 | 0.18 | 0.85 | 17.0 |
| 14 | 0.0090 | 0.029 | 1.00 | 2.21 | 0.005 | 1.40 | 0.16 | 0.91 | 16.0 |
| 15 | 0.0034 | 0.011 | 0.20 | 0.44 | 0.005 | 0.30 | 0.05 | 0.71 | 16.0 |
| 16 | 0.0044 | 0.014 | 0.15 | 0.33 | 0.008 | 0.20 | 0.10 | 0.12 | 16.0 |
| 17 | 0.0070 | 0.022 | 0.06 | 0.13 | 0.009 | 0.08 | 0.08 | 0.11 | 16.0 |
| 18 | 0.0053 | 0.017 | 0.15 | 0.33 | 0.010 | 0.21 | 0.10 | 0.26 | 16.0 |
| 19 | 0.0066 | 0.021 | 0.08 | 0.18 | 0.005 | 0.30 | 0.20 | 0.23 | 16.0 |
| 20 | 0.0030 | 0.010 | 0.02 | 0.04 | 0.020 | 0.04 | 0.16 | 2.40 | 16.0 |
| 21 | 0.0065 | 0.021 | 0.05 | 0.11 | 0.030 | 0.10 | 0.10 | 1.03 | 16.0 |
| 22 | 0.0010 | 0.003 | 0.04 | 0.09 | 0.005 | 0.05 | 0.15 | 0.94 | 16.0 |
| 23 | 0.0135 | 0.043 | 0.03 | 0.07 | 0.020 | 0.10 | 0.30 | 2.43 | 16.0 |
| 24 | 0.0068 | 0.022 | 0.10 | 0.22 | 0.020 | 0.13 | 0.10 | 3.41 | 16.0 |
| 25 | 0.0037 | 0.012 | 0.12 | 0.27 | 0.020 | 0.60 | 0.20 | 3.24 | 16.0 |
| 26 | 0.0056 | 0.018 | 0.11 | 0.24 | 0.020 | 0.15 | 0.10 | 1.88 | 16.0 |
| 27 | 0.0082 | 0.026 | 0.16 | 0.35 | 0.040 | 0.23 | 0.14 | 2.02 | 16.0 |
| 28 | 0.0150 | 0.048 | 0.13 | 0.29 | 0.040 | 0.18 | 0.10 | 1.14 | 16.0 |

(Note)
"0" means the component of interest is not included.

Using each of these wires, a steel plate having the composition shown in Table 4 was welded under the conditions shown in Table 5, and then the AW performance, SR performance, welding workability, and total evaluation of each sample was evaluated in the following way.

TABLE 4

| Steel | Plate thickness (mm) | Chemical components (% by mass) | | | | | | | | | |
|---|---|---|---|---|---|---|---|---|---|---|---|
| | | C | Si | Mn | P | S | Ni | Cr | Mo | Ti | B |
| SM490A | 16 | 0.15 | 0.32 | 1.34 | 0.010 | 0.001 | 0.01 | 0.03 | — | — | — |

(Note)
The balance includes Fe and inevitable impurities.

TABLE 5

| | |
|---|---|
| Steel | JIS G 3106 SM490A<br>Plate thickness 16 mm (Chemical components are shown in Table 4) |
| Groove shape | 60° V groove, Root gap = 1 mm, Root face = 1 mm |
| Wire | Flux-cored wires having components shown in Tables 2 and 3<br>(Wire diameter (diameter) 1.2 mm) |
| Shield gas | 100% $CO_2$/Ar + 20% $CO_2$, Flow rate = 25 liter/min |
| Welding position | Flat |
| Welding conditions | Current-voltage: 90-150 A/23-25 V (Root); 250-300 A/28-33 V (Filler)<br>Rate = 20-35 cm/min, Welding input heat = 1.0-2.5 kJ/mm |
| Polarity | DCEP (DC wire reversed polarity) |
| Number of layers | 5 layer - 9 pass |
| Preheating temperature | Room temperature (20-23° C.) |
| Interpass temperature | 140-160° C. |
| PWHT (Heat treatment after welding) | (1) AW (As-welded)<br>(2) SR (635° C. × 5 hrs, L.M.P = 18.9 × $10^3$) |

(Note)
In a wire No. 1-A, Ar + 20% $CO_2$ were used, whereas in the remaining other wires, 100% $CO_2$ was used.

<AW Performance>

According to test methods shown in Table 6, test specimens were fabricated from weld metals in the as-welded (AW) condition. Then, a tensile test and an impact test were performed on each test specimen to thereby measure 0.2% yield strength, a tensile strength, and an absorbed energy (vE) at −50° C. of the test specimen.

The determination of the AW performance was made by the tensile strength of the weld metal in the AW condition and the absorbed energy thereof at −50° C. Referring to the evaluation criteria, test specimens having a tensile strength of 490 MPa or more, and an absorbed energy at −50° C. of 50 J or more were rated "pass", while the remaining other test specimens were rated "fail". The results were shown in Table 8.

<SR Performance>

In test methods shown in Table 6, test specimens were fabricated from weld metals after stress relief annealing (SR). Then, a tensile test and an impact test were performed on each test specimen to measure 0.2% yield strength, a tensile strength and an absorbed energy (vE) at −50° C. of the test specimen. Annealing conditions were set to 635° C.×5 hrs, which corresponded to L.M.P. (Larson-Miller parameter)=18.9×103.

The SR performance was determined based on the tensile strength of the weld metal after SR and the absorbed energy thereof at −50° C. Referring to the evaluation criteria, test specimens having a tensile strength of 490 MPa or more, and an absorbed energy at −50° C. of 50 J or more were rated "pass", while the remaining other test specimens were rated "fail". The results were shown in Table 8.

TABLE 6

| | |
|---|---|
| Tensile test | JIS Z3111 A2 test specimen, Sampling position = Center of weld metal, Test temperature at Center of plate thickness = Room temperature (20-23° C.) |
| Impact test | JIS Z3111 V notch test specimen, Sampling position = Center of weld metal, Test temperature at Center of plate thickness = −50° C. |

<Welding Workability (Shape of a Back Bead, Amount of Generated Spatters, and Cracking Rate)>
<Back Bead Shape>

The outer appearance of a back bead in each test specimen was evaluated through the senses of estimators during the welding. Test specimens without having any back bead droop and with a good seam of the back bead were rated "A (pass)"; test specimens having a slight back bead droop after the welding were rated "B (pass)"; and test specimens having a remarkable back bead droop were rated "C (fail)". The results were shown in Table 8.

(Spatter Generation Amount)

The spatter generation amount of each test specimen was evaluated through the senses of estimators during the welding. Test specimens with smooth droplet transfer and a small amount of generated spatter were rated "A (pass)"; test specimens with slightly unstable arc and a large amount of generated spatter were rated "B (pass)"; and test specimens with unstable arc and a large amount of generated spatter were rated "C (fail)". The results were shown in Table 8.

(Cracking Rate)

Regarding evaluation of the cracking rate, the flux-cored wires having the compositions shown in Tables 2 and 3 and the steel plates having the composition shown in Table 4 were used. A weld metal welded under welding conditions shown in Table 7 was subjected to a butt-welding crack test with a hydraulic C-type high-speed jig (in accordance with JIS 3155) to thereby evaluate the cracking rate of the weld metal. The cracking rate was determined as the ratio (%) of the length of a crack to the bead length of a broken back bead as indicated by the following formula (1). Test specimens with a cracking rate of 10% or less were rated "pass"; and test specimens with a cracking rate exceeding 10% were rated "fail". Note that the cracks include a crater crack. The results were shown in Table 8.

$$\text{Cracking rate (\%)}=[\text{Total length of cracks}/(\text{back bead length}-\text{total length of cracks}]\times 100 \quad (1)$$

Test specimens rated "pass" in all items of the back bead shape, spatter generation amount and cracking rate were graded "pass" in terms of welding workability; and the remaining other test specimens were graded "fail" in terms of welding workability.

TABLE 7

| | |
|---|---|
| Steel | JIS G3106 SM490A |
| Groove shape | 90° Y groove, Root face = 10 mm, Root gap = 2.4 mm |
| Wire | Flux wires having components shown in Tables 2 and 3 (Wire diameter (diameter) 1.2 mm) |
| Shield gas | 100% $CO_2$/Ar + 20% $CO_2$, Flow rate = 25 liter/min |
| Welding position | Flat |
| Welding conditions | 280 A - 31 V- 35 cm/min |
| Number of layers | 1 layer - 1 pass |
| Preheating temperature | Room temperature (20-23° C.) |
| Number of repetition | Twice |

(Note)
In a wire No. 1-A, Ar + 20% $CO_2$ were used, whereas in the remaining other wires, 100% $CO_2$ was used.

<Total Evaluation>

Test specimens rated "pass" in all items of the AW performance, SR performance and welding workability were graded (A) or (B), in which the test specimens with the excellent welding workability were graded (A: excellent), while the test specimens having the welding workability slightly degraded but satisfying the pass criteria for the welding workability were graded (B: good). Test specimens in which one of the AW performance, SR performance and welding workability was rated "fail" were graded (C: slightly inferior). Test specimens in which two or more of the AW performance, SR performance and welding workability were rated "fail" were graded (D: inferior). The results were shown in Table 8.

had the welding workability slightly inferior to that in other Examples, which was not so problematic, the total evaluations of these wires were graded (B: good).

On the other hand, the wires No. 14 to 28 (Comparative Examples) did not satisfy the requirements of the present invention and thus were inferior in AW performance, SR performance and welding workability. As a result, in the total evaluation, these examples were graded (C: slightly inferior) or (D: inferior).

TABLE 8

| | Mechanical properties | | | | | | | | | |
|---|---|---|---|---|---|---|---|---|---|---|
| | AW performance (in the as-welded condition) | | | SR performance (635° C. × 5 hrs) | | | Welding workability | | | |
| Wire No. | 0.2% yield strength (MPa) | Tensile strength (MPa) | vE (−50° C.) (J) | 0.2% yield strength (MPa) | Tensile strength (MPa) | vE (−50° C.) (J) | Back bead shape | Spatter generation amount | Cracking rate (%) | Total evaluation |
| 1 | 520 | 612 | 86 | 452 | 556 | 108 | A | A | 2 | A |
| 1-A | 550 | 646 | 90 | 478 | 587 | 113 | A | A | 3 | A |
| 2 | 600 | 683 | 62 | 522 | 621 | 78 | A | A | 5 | A |
| 3 | 455 | 548 | 112 | 396 | 498 | 141 | A | A | 1 | A |
| 4 | 498 | 586 | 101 | 433 | 532 | 127 | A | A | 2 | A |
| 5 | 620 | 701 | 52 | 539 | 637 | 65 | A | A | 3 | A |
| 6 | 473 | 560 | 97 | 411 | 509 | 122 | A | A | 3 | A |
| 7 | 472 | 566 | 103 | 410 | 514 | 129 | A | A | 4 | A |
| 8 | 455 | 541 | 50 | 396 | 491 | 63 | A | A | 2 | B |
| 9 | 450 | 545 | 76 | 391 | 495 | 95 | B | A | 3 | B |
| 10 | 505 | 601 | 98 | 439 | 546 | 123 | A | A | 6 | A |
| 11 | 481 | 571 | 100 | 418 | 519 | 126 | B | A | 1 | B |
| 12 | 627 | 716 | 74 | 545 | 650 | 93 | B | B | 7 | B |
| 13 | 576 | 644 | 51 | 501 | 585 | 64 | B | B | 2 | B |
| 14 | 612 | 693 | 21 | 532 | 630 | 26 | B | B | 15 | D |
| 15 | 338 | 420 | 135 | 294 | 382 | 170 | C | A | 6 | D |
| 16 | 385 | 478 | 44 | 335 | 434 | 55 | B | A | 26 | D |
| 17 | 588 | 666 | 36 | 511 | 605 | 45 | C | B | 3 | D |
| 18 | 515 | 608 | 42 | 448 | 552 | 53 | A | B | 7 | C |
| 19 | 605 | 684 | 27 | 526 | 621 | 34 | B | B | 30 | D |
| 20 | 346 | 433 | 17 | 301 | 393 | 21 | B | B | 1 | D |
| 21 | 670 | 794 | 9 | 582 | 721 | 11 | A | C | 18 | D |
| 22 | 611 | 687 | 43 | 531 | 624 | 54 | A | A | 1 | C |
| 23 | 599 | 653 | 15 | 521 | 593 | 19 | B | B | 22 | D |
| 24 | 621 | 708 | 8 | 540 | 643 | 10 | B | B | 5 | D |
| 25 | 512 | 600 | 46 | 445 | 545 | 58 | A | C | 1 | D |
| 26 | 545 | 634 | 37 | 474 | 576 | 46 | C | B | 3 | D |
| 27 | 581 | 677 | 23 | 505 | 615 | 29 | C | B | 2 | D |
| 28 | 767 | 823 | 6 | 667 | 748 | 8 | A | C | 35 | D |

(Note)
In a wire No. 1-A, Ar + 20% $CO_2$ were used, whereas in the remaining other wires, 100% $CO_2$ was used.

As shown in Table 8, wires No. 1, 1-A, and 2 to 13 (Examples) satisfied the requirements of the present invention and thus achieved the excellent AW performance and SR performance, as well as the good or excellent welding workability. As a result, in the total evaluation, these examples were graded (A: excellent) or (B: good).

In the wire No. 3 (Example), the Si content as a Si source was less than its preferable lower limit. In the wire No. 8 (Example), the ratio of ([C]+[Si])/([Ti]+[Ni]) exceeded its preferable upper limit. The wire No. 9 (Example) did not contain a F compound and S. The wire No. 10 (Example) did not contain an F compound. The wire No. 11 (Example) had the Si content as a Si source of less than its preferable lower limit and did not contain S. The wire No. 13 (Example) had the Si content as a Si source of less than its preferable lower limit, as well as the Si-oxide ($SiO_2$) content exceeding its preferable upper limit thereof, and did not contain Al. In the wire No. 8 (Example), the absorbed energy included in the AW performance was on the border line of the criteria for decision of passing, so that the total evaluation was graded (B: good). Although the wires No. 9 and 11 to 13 (Examples)

In the wire No. 14 (comparative example), the Fe content was less than its lower limit, the Mn content exceeded its upper limit, the content in terms of F exceeded the preferable upper limit thereof, and the content in terms of Na or the like exceeded the preferably upper limit thereof. Thus, the wire No. 14 was inferior in AW performance, SR performance and welding workability.

In the wire No. 15 (comparative example), the C content was less than its lower limit, and the content in terms of Na or the like exceeded the preferable upper limit thereof. Thus, the wire No. 15 was inferior in AW performance, SR performance and welding workability.

In the wire No. 16 (comparative example), the Mn content was less than its lower limit, the Si content as the Si source was less than the preferable lower limit thereof, the Ti content exceeded its upper limit, the Ni content exceeded its upper limit, and the ratio of ([C]+[Si])/([Ti]+[Ni]) was lower than the preferable lower limit thereof. Thus, the wire No. 16 was inferior in AW performance, SR performance and welding workability.

In the wire No. 17 (Comparative Example), Si was not included, and the ratio of ([C]+[Si])/([Ti]+[Ni]) was less than the preferable lower limit. Thus, the wire No. 17 was inferior in AW performance, SR performance and welding workability.

In the wire No. 18 (Comparative Example), the Si content as the Si source was less than the preferable lower limit thereof, the Ti content exceeded its upper limit, the content in terms of Na or the like exceeded its upper limit, and the ratio of ([C]+[Si])/([Ti]+[Ni]) was less than the preferable lower limit thereof. Thus, the wire No. 18 was inferior in AW performance.

In the wire No. 19 (Comparative Example), the Ni content exceeded its upper limit, the content in terms of Na or the like exceeded the preferable upper limit thereof, and the ratio of ([C]+[Si]/([Ti]+[Ni]) was less than the preferable lower limit. Thus, the wire No. 19 was inferior in AW performance, SR performance and welding workability.

In the wire No. 20 (Comparative Example), the Fe content exceeded its upper limit, the Mn content was less than its lower limit, the Si content as the Si source was less than the preferable lower limit thereof, the Ni content was less than its lower limit, and the ratio of ([C]+[Si])/([Ti]+[Ni]) exceeded the preferable upper limit thereof. Thus, the wire No. 20 was inferior in AW performance and SR performance.

In the wire No. 21 (Comparative Example), the C content exceeded its upper limit, and the Si content as the Si source was less than the preferable lower limit thereof. Thus, the wire No. 21 was inferior in AW performance, SR performance and welding workability.

In the wire No. 22 (comparative example), the Mn content exceeded its upper limit, and the B content was less than its lower limit. Thus, the wire No. 22 was inferior in AW performance.

In the wire No. 23 (Comparative Example), the content in terms of Si exceeded its upper limit (the Si content as the Si source exceeded the preferable upper limit thereof), the B content exceeded its upper limit, and the ratio of ([C]+[Si])/([Ti]+[Ni]) exceeded the preferable upper limit thereof. Thus, the wire No. 23 was inferior in AW performance, SR performance and welding workability.

In the wire No. 24 (Comparative Example), the content in terms of Si exceeded its upper limit (the Si content as the Si source exceeded its upper limit), the Ti content was less than its lower limit, and the ratio of ([C]+[Si])/([Ti]+[Ni]) exceeded the preferable upper limit thereof. Thus, the wire No. 24 was inferior in AW performance and SR performance.

In the wire No. 25 (Comparative Example), the Ni was not contained, the Al content exceeded the preferable upper limit thereof, the content in terms of Na or the like exceeded the preferable upper limit thereof, and the ratio of ([C]+[Si]/([Ti]+[Ni]) exceeded the preferable upper limit thereof. Thus, the wire No. 25 was inferior in AW performance and welding workability.

In the wire No. 26 (Comparative Example), the content in terms of Si was less than its lower limit (the Si content as the Si source was less than the preferable lower limit thereof) and the ratio of ([C]+[Si])/([Ti]+[Ni]) exceeded the preferable upper limit thereof. Thus, the wire No. 26 was inferior in AW performance, SR performance and welding workability.

In the wire No. 27 (Comparative Example), the Ti content was less than its lower limit, the content in terms of Na or the like exceeded the preferable upper limit thereof, and the ratio of ([C]+[Si]/([Ti]+[Ni]) exceeded the preferable upper limit thereof. Thus, the wire No. 27 was inferior in AW performance, SR performance and welding workability.

In the wire No. 28 (Comparative Example), the C content exceeded its upper limit, and the B content exceeded its upper limit. Thus, the wire No. 28 was inferior in AW performance, SR performance and welding workability.

The invention claimed is:

1. A flux-cored wire with a flux filled into a steel outer sheath, the flux-cored wire comprising, relative to a total mass of the wire:
    Mn: 1.5 to 3.1% by mass;
    Ni: 0.2% or more by mass and less than 1.00% by mass;
    At least one kind of Si, a Si alloy and a Si oxide: 0.3 to 1.0% by mass in terms of Si;
    Ti: 0.05 to 0.29% by mass;
    C: 0.10 to 0.30% by mass;
    At least one kind of B, a B alloy, and a B oxide: 0.0030 to 0.0090% by mass in terms of B; and
    Fe: 91 to 97% by mass,
    Wherein ([C]+[Si])/([Ti)+[Ni]) is in a range of 0.30 to 1.2, where [C] is the C content, [Si] is the content in terms of Si, [Ti] is the Ti content, and [Ni] is the Ni content.

2. The flux-cored wire according to claim 1, wherein the Si content is in a range of 0.3 to 0.9% by mass relative to the total mass of the wire when using Si as a Si source.

3. The flux-cored wire according to claim 1, wherein the Si oxide content is in a range of 0.11 to 0.40% by mass relative to the total mass of the wire when using the Si oxide as a Si source.

4. The flux-cored wire according to claim 1, wherein the C content is more than 0.12% by mass and 0.30% or less by mass.

5. The flux-cored wire according to claim 1, further comprising, relative to the total mass of the wire:
    S: 0.005 to 0.040% by mass;
    Al: 0.10% or less by mass;
    a Na compound and a K compound in total: 0.20% or less by mass in terms of Na and K, respectively; and
    a F compound: 0.20% or less by mass in terms of F.

6. The flux-cored wire according to claim 1, which has a diameter in a range of 1.0 to 2.0 mm.

* * * * *